Feb. 26, 1963  F. H. ABBOTT  3,079,459
INSULATING SPICE JOINT SLEEVES
Filed July 18, 1960

INVENTOR.
FRED H. ABBOTT
BY
ATT'Y.

United States Patent Office 3,079,459
Patented Feb. 26, 1963

3,079,459
INSULATING SPLICE JOINT SLEEVES
Fred H. Abbott, Cuba, Mo.
Filed July 18, 1960, Ser. No. 45,256
3 Claims. (Cl. 174—91)

This invention relates to an insulating splice-joint sleeve for use with electrical cables and is a continuation-in-part of my copending application Serial No. 702,372, filed December 12, 1957, now abandoned.

Telephone and similar transmission lines used with communications equipment ordinarily consist of a plurality of separate conductors which are cabled and sheathed in a rubber or other suitable dielectric material. Since it is necessary, in laying transmission lines in the ground, to splice the ends of the successive cables together, various expedients have been employed to enclose and protect the section in which the splice is made. This same problem exists where a cable is tapped and spliced intermediate its ends to form a branch cable. However, no fully satisfactory method of protecting splice-joints has been developed and, consequently, telephone companies are continuously digging up and repairing or replacing splice-joints with attendant cost and interruptions in service.

The problem is not only one of resistance to ground corrosion and electrolysis, but also one of tensile strength. Transmission cables are usually located several feet below ground level and extend for many miles, following the profile of the land. Consequently, such cables are subjected to all the stresses affecting the soil, such as ground vibration, soil shifting and subsidence, minor earth tremors, frost-heaving and the like. As a result, the cable has a tendency to creep or move, and the movement imposes severe stresses upon the splice-joints.

It is, therefore, one of the objects of the present invention to provide a splice-joint sleeve which is somewhat resilient and flexible, but nevertheless strong, and, therefore, capable of resisting the various stresses imposed upon ground-laid cable.

It is also an object of the present invention to provide a splice-joint sleeve of the type stated which forms a dielectric and waterproof enclosure for the cable splice.

It is a further object of the present invention to provide a splice-joint sleeve of the type stated which is relatively inexpensive to manufacture and can be readily applied to the cable.

With the above and other objects in view, my invention resides in the novel features of form, construction, arrangement, and combination of parts presently described and pointed out in the claims.

In the accompanying drawings—

Figure 1:
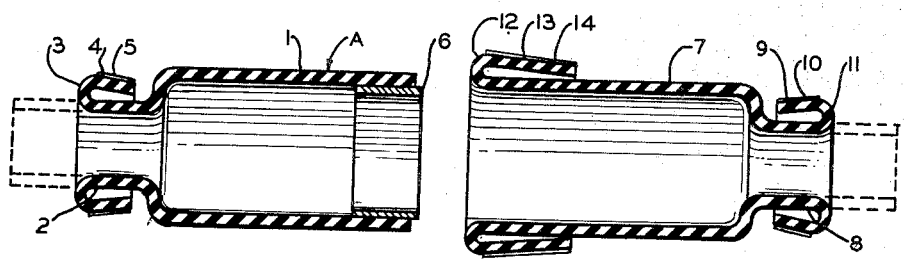
FIG. 1 is a sectional view of a splice-joint sleeve constructed in accordance with and embodying the present invention.
Figure 2:
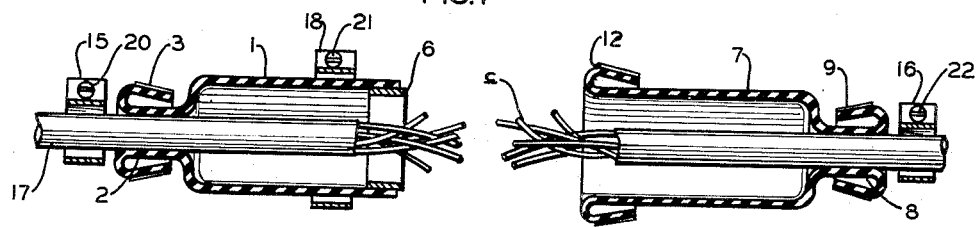
FIG. 2 is a sectional view showing the splice-joint sleeve in an intermediate stage of installation on a cable.
Figure 3:
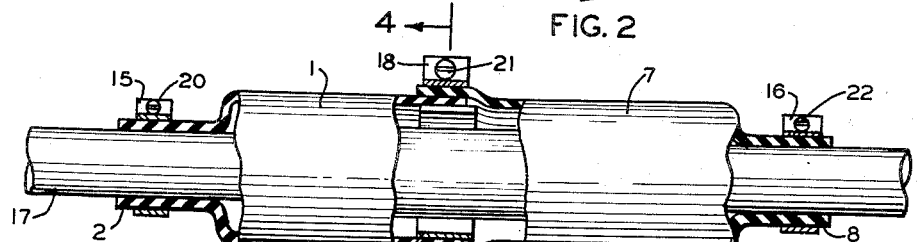
FIG. 3 is an elevational view partly broken away and in section and showing the splice-joint sleeve fully installed on the cable.

Referring now in more detail and by reference characters to the drawings, which illustrate a preferred embodiment of the present invention, A designates a splice-joint sleeve comprising a tubular member 1, preferably of polychloroprene or other suitable moisture resistance rubber, and provided at one end with a diametrally reduced portion 2 which is rolled back in the provision of an annular flange 3. On its outwardly presented surface, the flange 3 is provided with an annular band or coating of rubber cement 4 which is covered by a removable protective strip 5 of cloth or paper. Snugly and coaxially disposed within the member 1 at the other end thereof is a cylindrical ring 6 which is preferably of aluminum, but it should be understood that the ring 6 may be of other metals or of suitable hard plastic material. Moreover, the ring 6 may be bonded to the interior face of the member 1 or merely press-fitted therein, and a portion of the ring 6 extends forwardly of the member 1 as best seen in FIGS. 1 and 2.

Provided for cooperation with the member 1 is a tubular companion member 7, preferably of the same diameter as that of the member 1 and having a diametrally reduced end portion 8 which is rolled back in the provision of an annular flange 9, similar to the annular flange 3, previously described. The annular flange 9 is likewise provided with a rubber cement coating 10 which is covered by a removable protective strip 11. The other end of the companion member 7 is also rolled back to provide an annular flange 12 which is substantially greater in width than the width of the ring 6, and on its outer face the annular flange 12 is provided with a rubber cement coating 13 covered by a removable protective strip 14.

In use, two hose-type clamps 15, 18, are placed over one end of the cable 17 and a third hose-type clamp 16 is placed over the other end of the cable 17 and thereafter moved along the cable 17 to some point remote from the exposed conductors c. In this connection, it should be noted that the clamps 15, 16, are equally sized and have a nominal diameter substantially the same as the outside diameter of the reduced portions 2, 8, while the clamp 18 is somewhat larger than the clamps 15, 16, and has a nominal diameter slightly larger than that of the companion member 7. The clamps 15, 16, 18, are, furthermore, provided with screws 20, 21, 22, by which the clamps 15, 16, 18, may be tightened in place. After the clamps 15, 16, 18, have been placed on the cable 17, the members 1, 7, are placed thereover as shown in FIG. 2 and shifted away from the conductors c, at which time the conductors c can be soldered and taped together. When this is done, the members 1, 7, are shifted along the cable 17 and brought together so that the ring 6 is located approximately at the center of the spliced area. The protective strip 14 is removed and the annular flange 12 pulled forwardly so as to lie facewise over the outer surface of the member 1, at which time the rubber cement coating 10 will provide a firm and water-tight bond between the flange 12 and member 1. Similarly, the protective strips 5, 11, are removed from the flanges 3, 9, and the latter rolled forwardly so as to lie in bonded facewise contact with the outer insulated surface of the cable 17. Thereafter, the clamp 18 is shifted to a position over the flange 12 and ring 6, and the screw 21 turned so as to tighten the clamp 17. The clamps 15, 16, are then positioned over the flanges 3, 9, and tightened in place.

It will be apparent that cable splice covers in accordance with the present invention are highly resilient and flexible and will relieve stresses which arise from creeping of the cable 17 when it is buried in the ground. Moreover, the bonded connections between the members 1, 7, and the cable 17 are water-tight and are insured against leakage or separation by reason of the clamps 15, 16, 18.

Figures 4, 5:
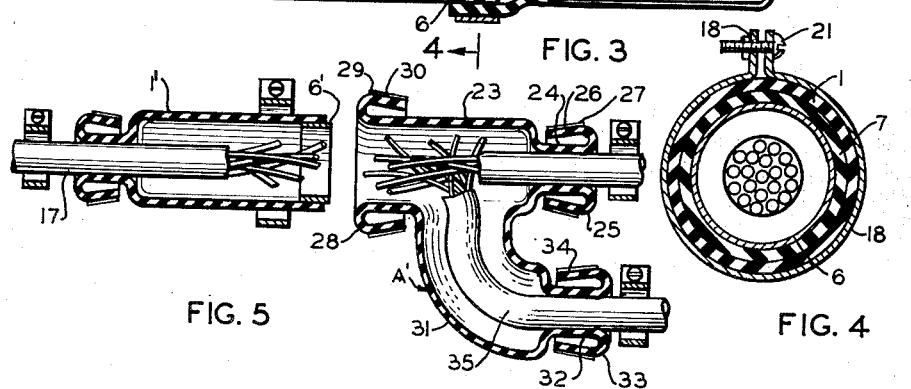
FIG. 4 is a sectional view taken along line 4—4 of FIG. 3.
FIG. 5 is a sectional view showing a modified form of splice-joint sleeve.

It is also possible to provide a modified form of splice-joint sleeve A′, as shown in FIG. 5, which is particularly useful in situations where a tap splice is made from a cable. In this form of the invention, the member 1′ and ring 6′ are identical to the member 1 and ring 6, previously described. Provided for cooperation with the member 1′, is a companion member 23 comprising a diametrally reduced end portion 24 having a rolled back annular flange 25 provided with a rubber cement coating 26 covered by a removable protective strip 27, and an annular flange 28 also provided with a rubber cement coating 29 and protective strip 30, all similar to the corresponding elements in the companion member 7, previously described. Intermediate the annular flanges 25, 28, the companion member 23 is integrally provided with a tubular branch member 31 which projects outwardly therefrom and is provided with a reduced end portion 32 substantially parallel with and similar to the reduced end portion 24. The end portion 32 is rolled back in the provision of an annular flange 33 which is rubber cement coated and covered with a protective strip 34. The splice-joint sleeve A' is used in a manner similar to that of the splice-joint sleeve A, and the branch sleeve 31 is fitted around the branch line cable 35 which is tapped into the main cable 17.

It should be understood that changes and modifications in the form, construction, arrangement, and combination of the several parts of the splice-joint sleeve may be made and substituted for those herein shown and described without departing from the nature and principle of my invention.

Having thus described my invention, what I claim and desire to secure by Letters Patent is:

1. In combination, an electrical splice-joint comprising cables arranged in end-to-end relationship in the region of the splice-joint and having conductors which are electrically spliced in such region, a sleeve fitted around and encircling said cables in the region of the splice-joint, said splice-joint sleeve comprising a pair of resilient dielectric tubular members of substantially larger diametral size than the cables and the mass created by their electrically spliced ends, said sleeve being sized to have an annular space between its inner peripheral surface and the spliced ends of said cables, said spliced ends being structurally unsupported and independent of the dielectric tubular members, an adhesive-coated diametrally reduced collar integrally formed on each member at one end thereof and being securely bonded to the respective cables for securing said members to the cables, an additional adhesive-coated flange integrally formed on one end of said members at its other end and bonded to the other of said members in overlapping aligned relation, a substantially rigid cylindrical member having an external diameter of such size to fit snugly within the overlapped ends of the tubular members in telescopic disposition, said cylindrical member furthermore having an internal diametral size substantially greater than the outside diametral size of the cables and the mass created by the spliced ends thereof, said cylindrical member also being annularly spaced from said spliced ends and remaining structurally unsupported by said spliced ends, thereby providing a cylindrical internal free space between the tubular members and the spliced ends across the region of such spliced ends so that the mechanical connection between the tubular members is wholly independent of the spliced ends, and clamping means disposed around each of said adhesive-coated flanges.

2. In combination, an electrical splice-joint comprising cables arranged in end-to-end relationship in the region of the splice-joint and having conductors which are electrically spliced in such region, a sleeve fitted around and encircling said cables in the region of a splice therein, said splice-joint sleeve comprising first and second resilient dielectric tubular members, said first and second members being substantially complementary in shape and each being provided with a neck portion and a body portion, said neck and body portions being coaxial and being separated by an annular shoulder which is substantially perpendicular to the common axis, a cable with insulation inserted into said neck portion, an adhesive-coated flange integrally formed on the neck portion of each member and bonded to the respective cables, the body portions of the tubular members being of substantially larger diametral size than the cables and the mass created by their electrically spliced ends, said tubular members also being spaced annularly from said cables and spliced ends and remaining structurally unsupported by and independent of said spliced ends, an additional adhesive-coated flange integrally formed on the body portion of said first member and bonded to said second member in overlapping aligned relation, a cylindrical member bonded to the inner surface of said second member at the overlap joint, and clamping means disposed around each of said adhesive-coated flanges.

3. In combination, an electrical splice-joint comprising cables arranged in end-to-end relationship in the region of the splice-joint and having conductors which are electrically spliced in such region, a sleeve fitted around and encircling said cables in the region of the splice-joint, said sleeve comprising first and second resilient dielectric tubular members, an adhesive-coated flange integrally formed on one end of each member and bonded to the respective cables, the other ends of the tubular members being of substantially larger diametral size than the cables and the mass created by their electrically spliced ends, said tubular members also being spaced annularly from said cables and spaced ends and remaining structurally unsupported by and independent of said spliced ends, an additional adhesive-coated flange integrally formed on the other end of the first member and fitted telescopically around and bonded to said other end of the second member in overlapping aligned relation, a cylindrical member telescopically disposed within and bonded to the inner surface of the overlapped end of the second member in a snug-fitting relationship, said cylindrical member furthermore having an internal diametral size substantially greater than the outside diametral size of the cables and the mass created by the spliced ends thereof, said cylindrical member also being annularly spaced from said cables and spliced ends and remaining structurally unsupported by said spliced ends, thereby providing an internal annular free space between the tubular members and the spliced ends across the region of such spliced ends so that the mechanical connection between the tubular members is wholly independent of the spliced ends, a resilient dielectric tubular branch member formed on and projecting laterally from one of said members and communicating with the interior thereof, an adhesive-coated flange formed on the free end of said branch member, and clamping means disposed around each of said adhesive-coated flanges.

References Cited in the file of this patent

UNITED STATES PATENTS 2,267,630    Weiland _____ Dec. 23, 1941

FOREIGN PATENTS 22,404    Great Britain _____ Dec. 23, 1891
474,388   Italy _____ Sept. 22, 1952